Aug. 6, 1968 R. J. PROSEN 3,396,047
BIAXIALLY ANISOTROPIC MAGNETIC THIN FILM STRUCTURE
WITH MAGNETIC DISCONTINUITIES
Filed Dec. 18, 1964

INVENTOR.
RICHARD J. PROSEN
BY Robert O. Vielas
ATTORNEY

United States Patent Office 3,396,047
Patented Aug. 6, 1968

3,396,047
BIAXIALLY ANISOTROPIC MAGNETIC THIN FILM STRUCTURE WITH MAGNETIC DISCONTINUITIES
Richard J. Prosen, Hopkins, Minn., assignor to Honeywell Inc., a corporation of Delaware
Filed Dec. 18, 1964, Ser. No. 419,400
6 Claims. (Cl. 117—8.5)

ABSTRACT OF THE DISCLOSURE

A magnetic thin film structure possessing biaxial anisotropy provided by the presence of substantially square magnetic discontinuties in the thin film.

---

The present invention is directed to thin film magnetic materials. More specifically, the present invention is directed to thin metallic films possessing the property of biaxial anisotropy.

Thin metal films have tended to replace ferrite cores in magnetic computer elements wherever possible due to the superior magnetic properties of thin metal films in regard to switching speeds and hysteresis losses. The most common thin magnetic films have been those films which possess an easy and a hard direction of magnetization. That is, the film possesses one axis under which it can be readily magnetized to produce a square hysteresis loop while in the axis 90° to this first axis a nonrectangular hysteresis loop is produced. More recently investigators have shown interest in films which will have two directions of easy magnetization at 90° to one another for use in magnetic memories.

I have found that a thin magnetic film may be produced by a variety of means so that the film will possess the property of biaxial anisotropy. Previous investigations of biaxial anisotropy have been principally in single crystal films. Broadly, I have found that a thin magnetic polycrystalline film possessing biaxial anisotropy may be produced where the thin magnetic film has rectangular, preferably square, discontinuities in the thin magnetic film. The magnetic material immediately surrounding the discontinuities possesses the property of biaxial anisotropy. The invention will be best understood from a study of the specification and drawing wherein:

Figure 1:
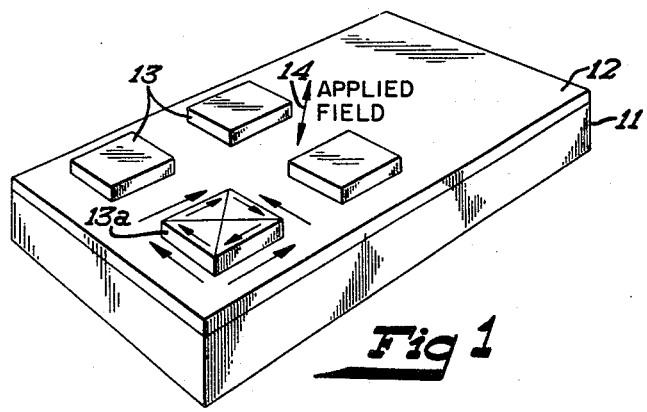
FIGURE 1 illustrates in schematic form a thin magnetic film having a magnetic discontinuity in substantially square form produced by deposition of additional magnetic material in square form thereon.

Referring now to FIGURE 1 there is seen a nonmagnetic substrate 11 (glass or copper coated glass is suitable) having produced on a surface thereof a thin film of a magnetic material 12. For the purposes of the discussion in the specification the thin magnetic film will be described with regard to a Permalloy composition of nominal composition 80% nickel–20% iron. These thin films of Permalloy are most commonly prepared by vacuum evacuation techniques. Such procedures are well known in the art and will not be dealt with here. While the invention will be described with regard to Permalloy films it should be recognized that any of the magnetic materials having low coercivity (below about 20 oersteds) may be utilized. For example electroless or chemically deposited films of nickel-cobalt may be used. Polycrystalline materials are preferred in which the uniaxial anisotropy has been suppressed.

Located on top of film 12 is a series of square regions of additional magnetic material, which may be the same material as magnetic film 12. These additional squares are generally identified as 13. These additional squares may be produced by depositing additional material through a mask or by selective etching techniques to partially etch away a portion of the thicker film to leave this structure. The thickness of magnetic film 12 can be from about 200 A. up to 1.3 microns. The individual squares 13 should lie in the range from 5 to 200 microns on a side. The thickness of the square should be 2 or 3 times that of the substrate magnetic material 12. Spacing between the magnetic discontinuities is preferably the same as the dimension of the squares, but should be less than 10 times this figure.

While I do not wish to be bound to any particular theory as to the reasons for the property of biaxial anisotropy appearing in a film such as just described, the following model based on Lorentz microscopic examination appears to satisfactorily explain the phenomena found.

Referring to FIGURE 1, and in particular square 13a and the material immediately adjacent to it, there is shown within the raised material forming the square domains of closure as represented by the arrows within the square. If a magnetic field is applied along the axis indicated by the large arrow 14 the material immediately adjacent to the square will align as indicated by the arrows surrounding the square to give a resultant in the direction of the applied field. This constitutes an open flux structure.

Figure 1A:
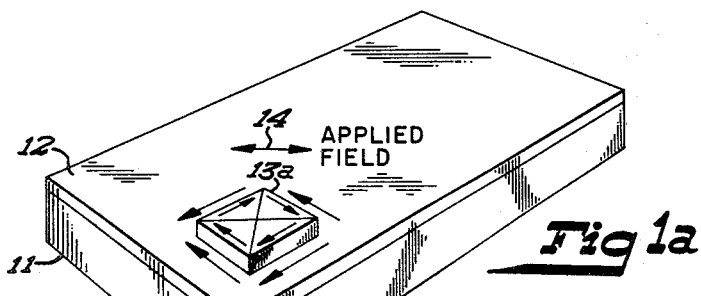

Referring to FIGURE 1a, there is illustrated the magnetic effect produced by applying the field at 90° to the direction indicated in FIGURE 1. As can be seen, the closed flux portion of the raised structure remains the same while the material immediately surrounding the square is reoriented to produce a resultant along the direction of the applied field. Thus, a thin film is produced which possesses two easy directions of magnetization.

Figure 2:
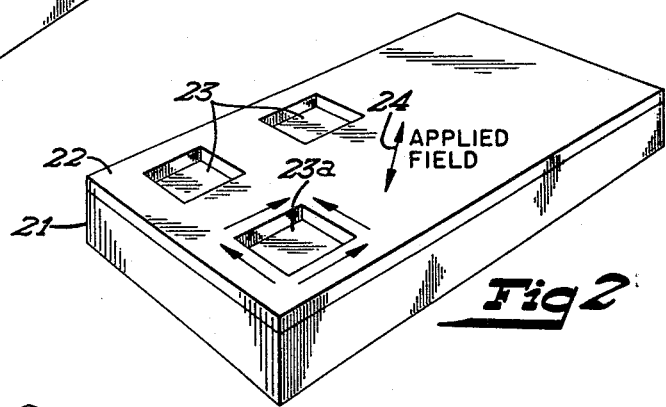
FIGURE 2 illustrates in schematic form a second method of producing magnetic discontinuities wherein a thin magnetic film is selectively etched to produce square voids in the film.

Referring now to FIGURE 2 there is illustrated a non-magnetic substrate 21 having a low coercivity magnetic film 22 produced on a surface thereof. The thickness of the magnetic film should be substantially as described with regard to FIGURE 1. Through the use of photoetching techniques a series of holes of generally square shape have been etched through the magnetic material down to substrate 21. These holes are generally identified 23. When a magnetic field is applied along the directions indicated by arrow 24, the material surrounding the hole magnetically orients as indicated by the arrows of hole 23a to give a resultant magnetic property along the direction of the applied field. As in the description with regard to FIGURE 1, altering the direction of applied field to 90° gives a similar easy direction of magnetization along that axis.

Figure 3:
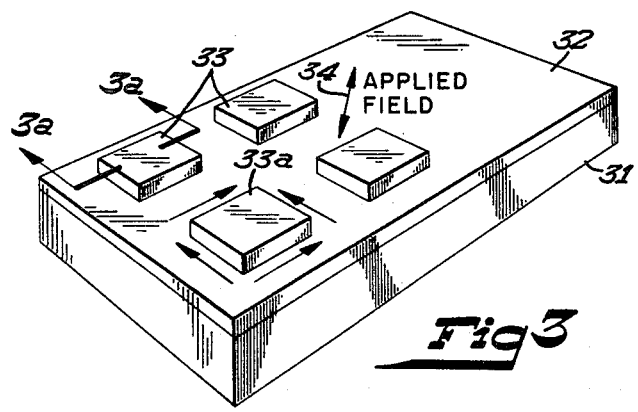
FIGURE 3 illustrates in schematic form a third method of producing magnetic discontinuities wherein a substrate is prepared having raised square regions on the surface thereof and having a thin magnetic film deposited over the substrate.
Figure 3A:
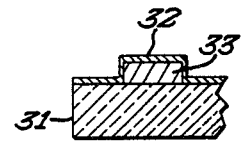

FIGURE 3 illustrates yet another form of producing a film possessing biaxial anisotropy. In this figure a thin magnetic film 32 is produced on a substrate 31 in accordance with the procedure and thicknesses outlined in the previous examples. However, as illustrated in FIGURE 3a, a somewhat different technique of producing the magnetic discontinuity is utilized in this method. Raised squares 33 are produced on the substrate material 31 prior to the deposition of magnetic material 32. The raised squares 33 may be an integral part of the substrate 31 or they may be produced in any number of ways. For example, a substrate material may have produced thereon squares of material by vapor deposition through a mask.

Gold is suitable material for this purpose. Any nonmagnetic material will perform satisfactorily. The thin magnetic material 32 is then deposited over this substrate structure to produce regions having magnetic discontinuities about the squares 33. The film deposited in this manner will possess the property of biaxial anisotropy as in the preceding examples described with regard to FIGURES 1 and 2. It will be found that very little if any magnetic material will be deposited along the vertical sides of raised portions 33 by vapor deposition techniques. The presence or absence of material on the vertical portions does not significantly affect the resulting biaxial anisotropy of the resultant product.

I claim:

1. A magnetic thin film structure possessing the property of biaxial anisotropy comprising:
   (1) a nonmagnetic substrate;
   (2) a continuous metallic film of magnetic material of from about 200 A. to about 13,000 A. in thickness in adherent relationship to said substrate and in one plane;
   (3) a plurality of substantially square magnetic discontinuities from about 5 microns up to about 200 microns on a side within said coating.

2. A magnetic thin film structure possessing the property of biaxial anisotropy comprising:
   (1) a nonmagnetic substrate;
   (2) a thin magnetic metallic film of from about 200 A. to about 13,000 A. in thickness in adherent relationship to said substrate, said film having a plurality of substantially square openings of from about 5 microns up to about 200 microns on a side therethrough.

3. A magnetic thin film structure possessing the property of biaxial anisotropy comprising:
   (1) a nonmagnetic substrate in a first plane;
   (2) a plurality of substantially square nonmagnetic regions of from about 5 microns up to about 200 microns on a side in adherent relationship to said substrate and extending above said plane;
   (3) a magnetic metallic film coating at least said first plane.

4. A magnetic thin film structure possessing the property of biaxial anisotropy comprising:
   (1) a nonmagnetic substrate;
   (2) a first magnetic metallic film in adherent relationship to said substrate;
   (3) a plurality of substantially square films of magnetic material in adherent relationship to said first film.

5. A magnetic thin film structure possessing the property of biaxial anisotropy comprising:
   (1) a nonmagnetic substrate;
   (2) a magnetic metallic film of from about 200 A. to about 13,000 A. in thickness in adherent relationship to said substrate;
   (3) a substantially square magnetic discontinuity within said film, said discontinuity being in the range of about 5 to about 200 microns on a side.

6. A film in accordance with claim 1 wherein the metallic film consists of a composition of about 80% nickel and 20% iron.

References Cited

UNITED STATES PATENTS

| | | | |
|---|---|---|---|
| 3,019,125 | 1/1962 | Eggenberger et al. | 117—8 |
| 3,077,021 | 2/1963 | Brownlow | 264—61 |
| 3,081,210 | 3/1963 | Wolf et al. | 156—8 |
| 3,100,295 | 8/1963 | Schweizerhof | 340—174 |
| 3,257,649 | 6/1966 | Dietrich et al. | 340—174 |

WILLIAM D. MARTIN, *Primary Examiner.*

W. D. HERRICK, *Assistant Examiner.*